(12) United States Patent
Shmueli

(10) Patent No.: US 8,527,467 B2
(45) Date of Patent: Sep. 3, 2013

(54) COMPRESSION-AWARE DATA STORAGE TIERING

(75) Inventor: Edi Shmueli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/173,969

(22) Filed: Jun. 30, 2011

(65) Prior Publication Data

US 2013/0006948 A1    Jan. 3, 2013

(51) Int. Cl.
*G06F 17/30* (2006.01)
(52) U.S. Cl.
USPC ........... 707/651; 707/653; 707/661; 707/665; 707/667; 707/693
(58) Field of Classification Search
USPC ............. 707/693, 694, 665, 651, 653, 661, 707/667; 711/117
See application file for complete search history.

(56) References Cited

U.S. PATENT DOCUMENTS

| 5,237,460 | A | * | 8/1993 | Miller et al. | 360/8 |
|---|---|---|---|---|---|
| 5,237,675 | A | * | 8/1993 | Hannon, Jr. | 710/68 |
| 5,247,638 | A | * | 9/1993 | O'Brien et al. | 710/68 |
| 5,305,295 | A | * | 4/1994 | Chu | 711/202 |
| 5,627,995 | A | * | 5/1997 | Miller et al. | 711/171 |
| 5,666,114 | A | * | 9/1997 | Brodie et al. | 341/50 |
| 5,710,909 | A | * | 1/1998 | Brown et al. | 711/170 |
| 5,812,817 | A | * | 9/1998 | Hovis et al. | 711/173 |
| 5,901,277 | A | * | 5/1999 | Chu et al. | 358/1.15 |
| 5,991,775 | A | * | 11/1999 | Beardsley et al. | 711/100 |
| 6,000,009 | A | * | 12/1999 | Brady | 711/112 |
| 6,032,148 | A | * | 2/2000 | Wilkes | 707/693 |
| 6,032,161 | A | * | 2/2000 | Fuller | 1/1 |
| 6,178,489 | B1 | * | 1/2001 | Singh | 711/173 |
| 6,737,997 | B2 | * | 5/2004 | Sakaguchi | 341/83 |
| 7,469,326 | B1 | * | 12/2008 | Hardman | 711/162 |
| 7,596,587 | B2 | * | 9/2009 | Berkhin et al. | 1/1 |
| 7,639,700 | B1 | * | 12/2009 | Nabhan et al. | 370/401 |
| 7,783,781 | B1 | * | 8/2010 | Rothstein et al. | 709/247 |
| 7,882,084 | B1 | * | 2/2011 | Amdahl | 707/693 |
| 8,117,235 | B1 | * | 2/2012 | Barta | 707/802 |
| 8,159,940 | B1 | * | 4/2012 | Helmy et al. | 370/230 |
| 8,203,949 | B1 | * | 6/2012 | Helmy et al. | 370/230 |
| 8,275,909 | B1 | * | 9/2012 | Rothstein | 709/247 |
| 8,320,735 | B2 | * | 11/2012 | Tanaka et al. | 386/239 |
| 8,321,645 | B2 | * | 11/2012 | Rabii et al. | 711/165 |
| 2002/0191692 | A1 | * | 12/2002 | Fallon et al. | 375/240 |
| 2004/0250011 | A1 | * | 12/2004 | Chen et al. | 711/103 |
| 2004/0260893 | A1 | * | 12/2004 | Pearl | 711/161 |
| 2005/0049884 | A1 | * | 3/2005 | Hunt et al. | 705/1 |
| 2006/0224828 | A1 | * | 10/2006 | Chen et al. | 711/117 |
| 2007/0050412 | A1 | * | 3/2007 | Robertson et al. | 707/104.1 |
| 2008/0019614 | A1 | * | 1/2008 | Robertson et al. | 382/305 |
| 2008/0021859 | A1 | * | 1/2008 | Berkhin et al. | 707/1 |
| 2008/0159585 | A1 | * | 7/2008 | True et al. | 382/100 |
| 2008/0229020 | A1 | * | 9/2008 | Plamondon | 711/122 |
| 2010/0077168 | A1 | | 3/2010 | Arakawa | |
| 2010/0077171 | A1 | * | 3/2010 | de La Torre et al. | 711/166 |

(Continued)

*Primary Examiner* — Sherief Badawi
(74) *Attorney, Agent, or Firm* — Griffiths & Seaton PLLC

(57) ABSTRACT

A method, including assigning, to each tier in a storage system comprising multiple tiers, a respective range of priority scores, and calculating a compression ratio for a file stored on one of the multiple tiers. Using the compression ratio, a priority score is calculated for the file, and the file is migrated to the tier whose assigned range of priority scores includes the calculated priority score.

14 Claims, 2 Drawing Sheets

(56) References Cited

U.S. PATENT DOCUMENTS

| | | | |
|---|---|---|---|
| 2010/0274983 A1* | 10/2010 | Murphy et al. | 711/162 |
| 2010/0281230 A1* | 11/2010 | Rabii et al. | 711/165 |
| 2011/0010518 A1* | 1/2011 | Kavuri et al. | 711/165 |
| 2011/0047317 A1* | 2/2011 | Burkard et al. | 711/103 |
| 2011/0082842 A1* | 4/2011 | Groseclose et al. | 707/693 |
| 2011/0145486 A1* | 6/2011 | Owa et al. | 711/103 |
| 2011/0302362 A1* | 12/2011 | Burkard et al. | 711/103 |
| 2012/0159112 A1* | 6/2012 | Tokusho et al. | 711/171 |
| 2013/0006948 A1* | 1/2013 | Shmueli | 707/693 |

* cited by examiner

US 8,527,467 B2

COMPRESSION-AWARE DATA STORAGE TIERING

FIELD OF THE INVENTION

This invention relates generally to computer storage, and specifically to using file compressibility as a factor for data storage tiering.

BACKGROUND OF THE INVENTION

Data storage tiering (also referred to herein as data tiering) is a technique used to improve performance in storage systems comprising multiple tiers of storage devices. In data tiering, the storage devices can be assigned to different tiers based on performance of the storage devices (e.g., faster storage devices can be assigned to a first tier and slower devices can be assigned to a second tier).

Typically, frequently used data is migrated to tiers comprising faster storage devices, and infrequently used data is migrated to tiers comprising slower storage devices. Examples of storage devices for faster storage tiers include solid state disks (SSDs), faster (e.g., 15,000 revolutions per minute) rotating disks such as Serial Attached Small Computer System Interface (SAS) and Fibre Channel (FC) drives, and outer tracks of a rotating disk (On a rotating disk, the outer tracks of the disk typically access data faster than the inner tracks of the disk.) Examples of storage devices for slower storage tiers include slower (e.g., 7,500 revolutions per minute) rotating disks such as SATA drives, and the inner tracks of rotating disks.

Migrating frequently used data files to faster storage tiers can help reduce input/output (I/O) bottlenecks that may occur due to contention (e.g., for the data file, the storage device, or an I/O bus coupled to the storage device). Likewise, migrating less frequently used data files to slower tiers may not significantly impact performance, since there is typically no simultaneous contention for the file. Therefore, data tiering can help increase the performance of storage systems, while having a minimal cost impact.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including assigning, to each tier in a storage system comprising multiple tiers, a respective range of priority scores, calculating a compression ratio for a file stored on one of the multiple tiers, calculating, using the compression ratio, a priority score for the file, and migrating the file to the tier whose assigned range of priority scores includes the calculated priority score.

There is also provided, in accordance with an embodiment of the present invention an apparatus, including a storage system comprising multiple tiers, and a processor configured to assign, to each of the tiers, a respective range of priority scores, to calculate a compression ratio for a file stored on one of the multiple tiers, to calculate, using the compression ratio, a priority score for the file, and to migrate the file to the tier whose assigned range of priority scores includes the calculated priority score.

There is further provided, in accordance with an embodiment of the present invention a computer program product, the computer program product including a non-transitory computer readable storage medium having computer readable program code embodied therewith, the computer readable program code including computer readable program code configured to assign, to each tier in a storage system comprising multiple tiers, a respective range of priority scores, computer readable program code configured to calculate a compression ratio for a file stored on one of the multiple tiers, computer readable program code configured to calculate, using the compression ratio, a priority score for the file, and computer readable program code configured to migrate the file to the tier whose assigned range of priority scores includes the calculated priority score.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Data compression is a technique used to reduce the space required to store data files on storage devices. Data compression can help reduce the consumption of expensive resources, such as disk space (on devices such as solid state disks and rotating disks) and input/output (I/O) bandwidth. The design of data compression schemes can involve trade-offs among various factors, including the degree of compression, and the computational resources required to compress and uncompress the data.

In some instances (especially for files that can be compressed to a small fraction of their original size), data compression can increase the I/O performance of a storage device. The increased performance is due to the fact that the time required to retrieve uncompressed data from a storage device is typically greater than the time required to retrieve and uncompress compressed data. Likewise, the time required to store uncompressed data to a storage device is typically greater than the time required to compress and store the data.

Embodiments of the present invention provide methods and systems for including the compressibility of data as a factor when implementing data storage tiering in a storage system. In some embodiments, a priority score is calculated for each file in the storage system, and each of the storage tiers is assigned a respective range of priority scores. Based on their respective calculated priority scores, the files can be migrated (if necessary) to the appropriate storage tier.

In some embodiments, the priority score can be calculated based on the file's compressibility and usage frequency. As described supra, compressed data having a smaller storage footprint (i.e., than the corresponding uncompressed data) typically enjoys faster storage access times than non-compressed data. Therefore, migrating compressed data to faster storage may penalize less compressible data (typically having slower access times) that was migrated to slower storage tiers. Embodiments of the present invention can provide a level of fairness to less compressible data in the context of storage tiering by introducing a tunable parameter that enables storage tiering behavior to be based solely on usage frequency, solely on compressibility, or a combination of the two.

System Description

Figure 1:
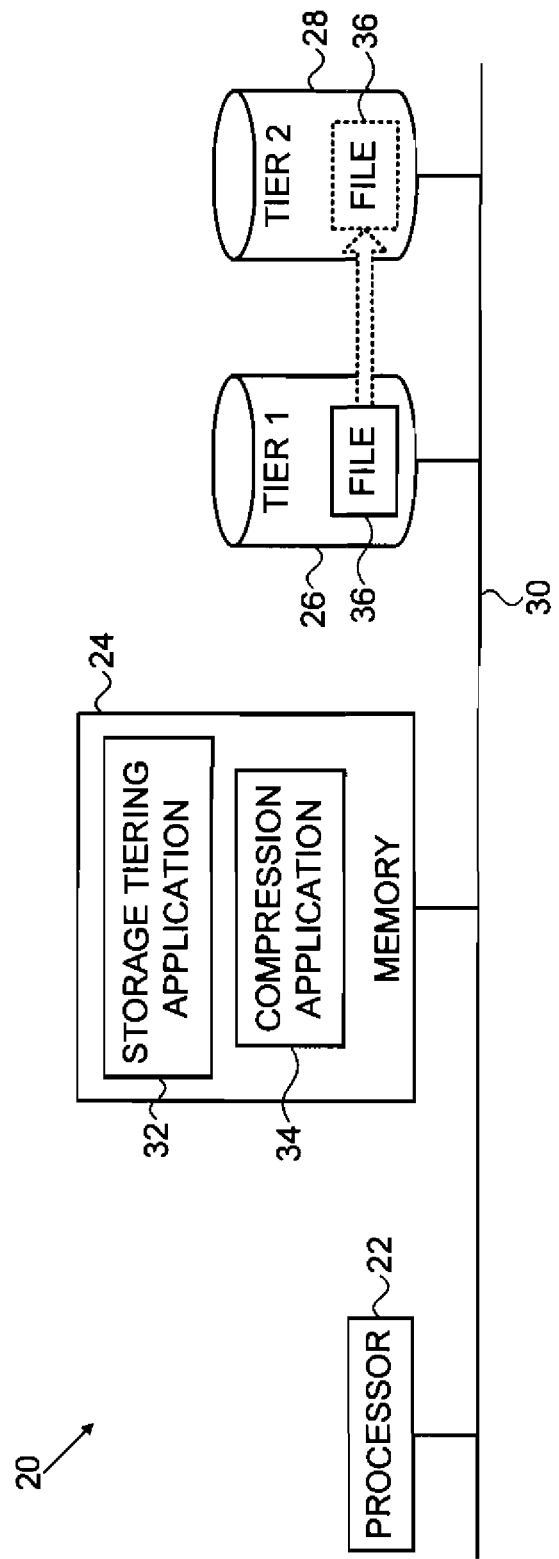
FIG. 1 is a schematic pictorial illustration of a system configured to perform compression-aware data storage tiering, in accordance with an embodiment of the present invention.

FIG. 1 is a schematic pictorial illustration of a storage system 20 configured to perform compression-aware data storage tiering, in accordance with an embodiment of the present invention. System 20 comprises a processor 22, a memory 24, and storage devices 26 and 28, all coupled via a bus 30.

The storage devices in system 20 are divided into two storage tiers, where each storage device is assigned to a tier based on the performance of the storage device. For example, tier 1 may comprise the faster storage devices and tier 2 may comprise the slower storage devices. Continuing the example, storage device 26 (i.e., tier 1) may comprise a solid state disk (SSD), and storage device 28 (i.e., tier 2) may comprise a rotating disk drive. While the configuration system 20 in FIG. 1 shows a single storage device in each of the two storage tiers, a typical implementation of system 20 may include more than two storage tiers, with multiple storage devices in each of the storage tiers.

Processor 22 executes a storage tiering application 32 and a compression application 34 from memory 24. Data stored on the storage devices can be stored as either compressed or non-compressed data. As described supra, in addition to typically requiring less space on the storage devices, storing compressed data can increase the performance of system 20. Compression application 24 is configured to compress data to be written to a file 36, and to uncompress data read from the file. In alternative configurations, the functionality of compression application 34 may be integrated into a hardware module (not shown) in system 20.

In operation, storage tiering application 32 (discussed in further detail hereinbelow) calculates a priority score P for file 36 (plus any other files stored on storage devices 26 and 28), and compares the calculated priority score to a respective range of priority scores assigned to each of the storage tiers. In the example shown in FIG. 1, file 36 is initially stored in tier 1 (i.e., on storage device 26). If the calculated priority score within the range of priority scores assigned to tier 2 (i.e., storage device 28), then storage tiering application 32 can migrate file 36 to storage device 28 (as indicated by the arrow).

Processor 22 typically comprises a general-purpose computer configured to carry out the functions described herein. Software operated by the processor may be downloaded to the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Data Storage Tiering

As described supra, embodiments of the present invention use compressibility as a parameter for a priority score for file 36. Storage tiering application 32 can then use the calculated priority score to determine the appropriate storage tier for file 36. Storage tiering application 32 can calculate the compressibility as a compression ratio C for file 36 as follows:

$$C = (\text{Compressed Size})/(\text{Uncompressed Size}) \quad (1)$$

For example, if file 36 comprises 10 megabytes (MB) of uncompressed data that can be compressed to 2 MB, then C=0.2. The compression ratio of the file has a negative correlation to the compressibility of the file. In other words, higher calculated values of C for a given file item indicate lower compressibility, and vice versa.

Another parameter that can be used when calculating the priority score is a normalized usage frequency F (typically between 0 and 1) for file 36. Storage tiering application 32 can calculate F from usage statistics that are regularly collected for file 36, and for other files (not shown) in system 20, over an observation period.

For example, if Max is the maximal number of times system 20 accesses any file (i.e., including file 36) over the observation period, Min is the minimal number of times system 20 accesses any file over an observation period, and Times is the number of times system 20 accesses file 36 over the observation period, then storage tiering application 32 can calculate the usage frequency F for file 36 as follows:

$$F = (\text{Times} - \text{Min})/(\text{Max} - \text{Min}) \quad (2)$$

Higher values of F for a particular file indicate that during the observation period, system 20 accessed the particular file more frequently than other files in the system. Likewise, lower values of F for a particular file indicate that during the observation period, system 20 accessed the particular file less frequently than the other files in the system.

After calculating C and F, storage tiering application 32 can calculate a priority score P as follows:

$$P = \alpha * C + (1 - \alpha) * F \quad (3)$$

where $\alpha$ is a tunable parameter, ($0 \leq \alpha \leq 1$), that sets a calculation weight for C and F. For example, If $\alpha=0$, then P=F, and storage tiering application 32 can therefore determine the appropriate tier for file 36 solely based on usage statistics. On the other hand, if $\alpha=1$, then P=C, and storage tiering application 32 therefore ignores all usage statistics, and can determine the appropriate tier for file 36 solely based on the compressibility of the file. If $\alpha$ is between 0 and 1, then data tiering application 32 can determine the appropriate tier for file 36 based on a combination of compressibility and usage frequency.

Although Equation (3) shows a particular calculation for P using C and F, other calculations for a priority score based on the compressibility of file 36 can also be employed to implement embodiments of the present invention, and are thus considered to be within the spirit and scope of the present invention.

Figure 2:
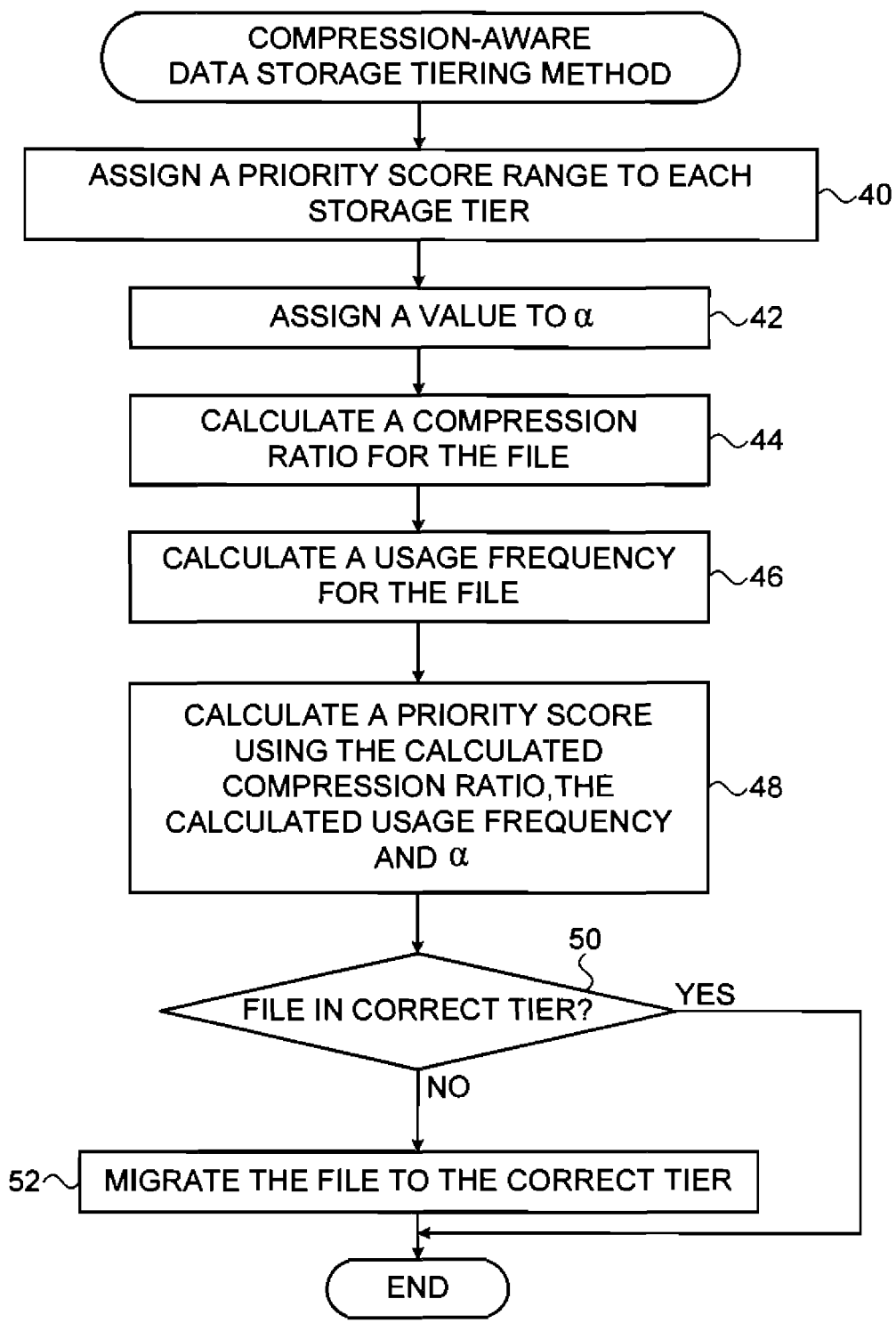
FIG. 2 is a flow diagram that schematically illustrates a method of performing compression-aware data storage tiering, in accordance with an embodiment of the present invention.

FIG. 2 is a flow diagram that schematically illustrates a method of performing compression-aware data storage tiering, in accordance with an embodiment of the present invention. In a first initialization step 40, system 20 sets ranges of priority scores for storage device 26 (i.e., tier 1) and storage device 28 (i.e., tier 2). The ranges of priority scores for the storage devices are typically contiguous and non-overlapping numeric ranges. For example, the system 20 can set the priority score range for storage device 28 to between 0 and 0.30, and the priority score range for storage device 26 to between 0.31 and 1.

The system 20 can be adapted to utilize a default value or values for the priority score, or in an additional embodiment, the priority score may not be initially set. The system 20 can dynamically (automatically) calculate appropriate priority score ranges, or the system 20 may adjust the priority score ranges over time, for example as data compressibility and usage frequency may vary. In this manner, the applicable priority score or priority score range may also vary over time. As one of ordinary skill in the art will appreciate, various additional factors may be brought to bear in determining an appropriate priority score range by the system 20. In an additional embodiment, a system administrator (not shown) may set ranges of priority scores.

In one embodiment, the system 20 assigns lower priority score ranges to lower performance storage tiers (e.g., tier 2), and higher priority score ranges to higher performance storage tiers (e.g., tier 1). In the configuration shown in FIG. 1, storage device 26 (i.e., tier 1) may comprise a solid state disk (SSD), and storage device 28 (i.e., tier 2) may comprise a rotating disk drive. Therefore (depending on $\alpha$), storage tiering application 32 may store more highly compressed files (i.e., files with lower values of C) and/or less frequently used files (i.e., files with lower values of F) to storage device 28, and less highly compressed files (i.e., files with higher values of C) and/or more frequently used files (i.e., files with higher values of F) to storage device 26.

Including the compressibility of data as a factor in the calculation for P enables embodiments of the present invention to provide a level of fairness to less compressible data. Since more highly compressed data typically enjoys faster storage access times than less highly compressed data, storage tiering application 32 can store less compressible data in a higher performance storage tier (e.g., storage device 26), thereby providing faster storage access time to the less compressible data.

In a second initialization step 42, the system sets $\alpha$ in order to control the behavior of storage tiering application 32. In some configurations, as in previous step 40, storage tiering application 32 can be configured to optimize the overall performance of system 20 by dynamically setting the priority score ranges and/or dynamically setting a value for $\alpha$. In an additional embodiment, the system administrator may also set $\alpha$.

In a first calculation step 44, storage tiering application 32 calculates a compression ratio for file 36 using Equation (1). In a second calculation step 46, storage tiering application 32 calculates usage frequency for file 36 using Equation (2), and in a third calculation step 48, the storage tiering application calculates a priority score for the file, using the calculated compression ratio, usage frequency, and α as parameters for Equation (3). In a comparison step 50, if file 36 is currently stored in the correct tier (i.e., the calculated priority score for the file is within the priority score range assigned to storage device currently storing the file), then the method terminates. However, if file 36 is not currently stored in the correct tier (i.e., the calculated priority score for the file is not within the priority score range assigned to storage device storing the file) then the method concludes with a migration step 52, where data tier application 32 migrates the file to the correct tier (i.e., the storage tier whose assigned priority score range includes the calculated priority score). In the example shown in FIG. 1, storage tiering application 32 migrates file 36 from storage device 26 to storage device 28.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
assigning, to each tier in a storage system comprising multiple tiers, a respective range of priority scores, each range being continuous and non-overlapping, the multiple tiers including a higher performance storage tier and a lower performance storage tier;
calculating a compression ratio for a file stored on one of the multiple tiers;
calculating, using the compression ratio, a priority score for the file, wherein a higher compression ratio indicates less compressible data and a lower compression ratio indicates more highly compressible data, the priority score (P) is represented by $P=\alpha*C+(1-\alpha)*F$, where C is the compression ratio, F is the usage frequency, α is a tunable parameter configured to set weights for the compression ratio and the usage frequency, and $0<\alpha<1$; and
based on the priority score calculated for the file, migrating the file to the tier whose assigned range of priority scores includes the calculated priority score, wherein the higher performance storage tier is assigned a first range of priority scores including the higher compression ratio to thereby store the less compressible data, and the lower performance storage tier is assigned a second range of priority scores including the lower compression ratio to thereby store the more highly compressible data.

2. The method, according to claim 1, wherein each of the multiple tiers comprises one or more storage devices.

3. The method according to claim 2, wherein each of the storage devices is assigned to each of the tiers based on performance of the each of the storage devices.

4. The method according to claim 1, wherein the respective ranges comprise contiguous and non-overlapping numeric ranges.

5. An apparatus, comprising:
a memory;
a storage system comprising multiple tiers, the multiple tiers including a higher performance storage tier and a lower performance storage tier; and
a processor in communication with the memory configured to assign, to each of the tiers, a respective range of priority scores, each range being continuous and non-overlapping, to calculate a compression ratio for a file stored on one of the multiple tiers, wherein a higher compression ratio indicates less compressible data and a lower compression ratio indicates more highly compressible data, to calculate, using the compression ratio, a priority score for the file, the priority score (P) is represented by $P=\alpha*C+(1-\alpha)*F$, where C is the compression ratio, F is the usage frequency, α is a tunable parameter configured to set weights for the compression ratio and the usage frequency, and $0<\alpha<1$, and based on the priority score calculated for the file, to migrate the file to the tier whose assigned range of priority scores includes the calculated priority score, wherein the higher performance storage tier is assigned a first range of priority scores including the higher compression ratio to thereby store the less compressible data, and the lower performance storage tier is assigned a second range of priority scores including the lower compression ratio to thereby store the more highly compressible data.

6. The apparatus according to claim 5, wherein each of the multiple tiers comprises one or more storage devices.

7. The apparatus according to claim 6, wherein the processor is configured to assign each of the storage devices to each of the tiers based on performance of the each of the storage devices.

8. The apparatus according to claim 5, wherein the respective ranges comprise contiguous and non-overlapping numeric ranges.

9. A computer program product, the computer program product comprising:
a non-transitory computer readable storage medium having computer readable program code embodied therewith, the computer readable program code comprising:
computer readable program code configured to assign, to each tier in a storage system comprising multiple tiers, a respective range of priority scores, each range being continuous and non-overlap, the multiple tiers including a higher performance storage tier and a lower performance storage tier;
computer readable program code configured to calculate a compression ratio for a file stored on one of the multiple tiers, wherein a higher compression ratio indicates less compressible data and a lower compression ratio indicates more highly compressible data;
computer readable program code configured to calculate, using the compression ratio, a priority score for the file, wherein the priority score (P) is represented by $P=\alpha*C+$ $(1-\alpha)*F$, where C is the compression ratio, F is the usage frequency, $\alpha$ is a tunable parameter configured to set weights for the compression ratio and the usage frequency, and $0<\alpha<1$;

computer readable program code configured to, based on the priority score calculated for the file, migrate the file to the tier whose assigned range of priority scores includes the calculated priority score, wherein the higher performance storage tier is assigned a first range of priority scores including the higher compression ratio to thereby store the less compressible data, and the lower performance storage tier is assigned a second range of priority scores including the lower compression ratio to thereby store the more highly compressible data.

10. The computer program product according to claim 9, wherein each of the multiple tiers comprises one or more storage devices.

11. The computer program product according to claim 10, wherein the computer readable program code is configured to assign each of the storage devices to each of the tiers based on performance of the each of the storage devices.

12. The computer program product according to claim 9, wherein the respective ranges comprise contiguous and non-overlapping numeric ranges.

13. The method of claim 1, further comprising changing the assigned range of priority scores from a first range to a second range.

14. The method of claim 1, further comprising dynamically setting a value for the tunable parameter to optimize overall performance of the storage system.

* * * * *